US012630439B2

(12) United States Patent
Mohamed et al.

(10) Patent No.: US 12,630,439 B2
(45) Date of Patent: May 19, 2026

(54) TWO STAGES EXTRACTION METHOD FOR SYNTHESIZING PRECIPITATED CALCIUM CARBONATE

(71) Applicant: R-S OSA SERVICE OÜ, Tallinn (EE)

(72) Inventors: Hussain Azeez Mohamed, Sollentuna (SE); Anders Kihl, Sollentuna (SE); Alar Saluste, Tallinn (EE); Mai Uibu, Tallinn (EE); Andres Trikkel, Tallinn (EE); Rein Kuusik, Tallinn (EE); Kadriann Tamm, Tallinn (EE); Ae Leier, Tallinn (EE); Riho Mõtlep, Tartu (EE); Kalle Kirsimäe, Tartu (EE)

(73) Assignee: R-S OSA SERVICE OÜ, Tallinn (EE)

( * ) Notice: Subject to any disclaimer, the term of this patent is extended or adjusted under 35 U.S.C. 154(b) by 628 days.

(21) Appl. No.: 17/928,417

(22) PCT Filed: Jun. 1, 2020

(86) PCT No.: PCT/EP2020/065108
§ 371 (c)(1),
(2) Date: Nov. 29, 2022

(87) PCT Pub. No.: WO2021/244727
PCT Pub. Date: Dec. 9, 2021

(65) Prior Publication Data
US 2023/0212020 A1      Jul. 6, 2023

(51) Int. Cl.
*C01F 11/18*          (2006.01)
(52) U.S. Cl.
CPC ................................... *C01F 11/182* (2013.01)
(58) Field of Classification Search
CPC .............................. C01F 11/182; Y02W 30/91
See application file for complete search history.

(56) References Cited

U.S. PATENT DOCUMENTS

| | | | | |
|---|---|---|---|---|
| 2013/0336859 | A1* | 12/2013 | Tavakkoli | ............... C09C 1/021 |
| | | | | 423/175 |
| 2018/0127284 | A1* | 5/2018 | Pohl | ...................... D21H 17/675 |
| 2020/0129916 | A1* | 4/2020 | Constantz | .......... B01D 53/1475 |

FOREIGN PATENT DOCUMENTS

| | | | | |
|---|---|---|---|---|
| KR | 20190055426 | A | 5/2019 | |
| TW | 202012643 | A * | 4/2020 | ............... B09B 3/35 |
| WO | 2015097674 | A1 | 7/2015 | |

OTHER PUBLICATIONS

Machine translation of WO2015/097674. publicatoin date Jul. 2, 2015.*

(Continued)

*Primary Examiner* — Jun Li
(74) *Attorney, Agent, or Firm* — LADAS & PARRY LLP

(57) ABSTRACT

Present invention relates to a multi-stage method for preparing high purity calcium carbonate precipitate from wastes and by-products containing high concentrations of calcium and silica. The calcium and silica rich material is introduced into a stirred reactor containing the extraction solution. The calcium rich solution, produced in the reactor, is separated from residual material and a gas containing carbon dioxide is passed into the said solution to precipitate calcium carbonate. The calcium carbonate precipitate is then separated from solution. The recovered solution and residual material, from previous extraction stage; is stirred in a reactor to further extract calcium from the residual material. After separating the solids from solution, carbon dioxide containing gas is introduced into solution to again precipitate calcium carbonate. Calcium carbonate precipitate is then separated from solution. The residual material produced from the process is characterized by high silica content.

17 Claims, 5 Drawing Sheets

(56) References Cited

OTHER PUBLICATIONS

Sanna et al(A review of mineral carbonation technologies to sequester $CO_2$, Chem. Soc. Rev., 2014, 43, 8049-8080).*

Tamm et al. (Modelling continuous process for precipitated calcium carbonate production from oil shale ash, Energy Procedia 114 ( 2017 ) 5409-5416).*

International Search Report of Application No. PCT/EP2020/065108 mailed Mar. 9, 2021.

Written Opinion of Application No. PCT/EP2020/065108 mailed Mar. 9, 2021.

Victor Morales-Florez, et al.: "Calcium silicates synthesised from industrial residues with the ability for $CO_2$ sequestration", Waste Management and Research, vol. 32, No. 12, Dec. 1, 2014 (Dec. 1, 2014), p. 1178-1185, XP055780205.

Tamilselvi Dananjayan Rushendra Revathy et al.: "Direct mineral carbonation of coal fly ash for CO2sequestration", Journal of Cleaner Production. Elsevier, Amsterdam, NL, vol. 112, Jun. 25, 2015 (Jun. 25, 2015), p. 4173-4182, XP029358806.

S. Eloneva, et al.: "Fixation of CO* 2 by carbonating calcium derived from blast furnace slag". Sep. 1, 2008 (Sep. 1, 2008), vol. 33, No. 9. p. 1461-1467, XP023172250.

\* cited by examiner

ARRANGEMENT OF MODULES

TWO STAGES EXTRACTION METHOD FOR SYNTHESIZING PRECIPITATED CALCIUM CARBONATE

CROSS REFERENCE TO RELATED APPLICATIONS

This application is a U.S. National Stage Application under 35 U.S.C. § 371 of International Application No. PCT/EP2020/065108, which was filed on 1 Jun. 2020, the contents of which are hereby incorporated by reference in their entirety.

BACKGROUND OF THE INVENTION

Field of the Invention

Since the art describes extraction of calcium from waste and industrial by-products, in an aqueous media, while concentrating silica in solid form; the field of invention relates to hydrometallurgy.

Present invention relates to a method and a process of synthesizing high purity calcium carbonate precipitate from wastes and by-products rich in calcium and silica. The process also simultaneously produces a silicate rich residual material that can be used as a silica source in industries. Said materials are inorganic and alkaline; typical examples are oil shale ash from energy or oil and gas generation, coal ash and waste cement.

Description of Related Art

1) Growing demand on world's energy resources and countries' ambition to achieve energy independence has resulted in many nations opting for low calorific sources for energy. For instance, in Estonia, approximately 15 million tonnes of oil shale is mined per annum, for use in their energy sector[1]. Consequently, it is estimated that around 7 million tonnes of calcium rich, highly alkaline waste material is generated yearly. Due to Estonia's heavy reliance on oil shale, it has the most carbon-intensive and the third most energy intensive economy in the OECD[2].

Data shows that of the oil shale ash generated, in Estonia, only a minute amount (approximately 3%) is re-used while the rest is deposited in open land without treatment[3]. A study conducted by Blinova et al. (2012) attributed the high alkalinity (pH>10) of oil shale ash, for its toxic effects on living organisms. The high alkalinity exhibited is attributed to the abundancy of calcium compounds in the material.

2) After water, concrete is the most widely used material globally, as it is the main material used in infrastructure installations. With this high consumption of concrete, large amounts of concrete based waste are produced. For instance, more than 900 million tonnes of concrete waste per year are produced in Europe, USA and Japan combined; where Europe alone contributes 510 million tonnes to this figure[5]. Portland cement, the binding agent in 98% of the concrete produced globally, is highly alkaline (pH 12-13) and comprises of more than 60 w/w % calcium oxide[6].

3) Around the world, precipitated calcium carbonate is produced from a variety of high purity calcium feedstock by; carbonation process, Solvay method, lime-soda process, calcitech process or filler recycling process[7]. Of these processes, carbonation is the most widely used method. Traditionally, in the carbonation process, the calcium carbonate is precipitated by passing carbon dioxide through an aqueous suspension of calcium hydroxide. The calcium hydroxide used here is formed by mixing an aqueous solution or water and burnt lime (CaO). Burnt lime is a product of calcination of mined limestone. Preparation of mined feedstock for calcination and the calcination process itself are all energy intensive processes that are well documented to have a large carbon footprint.

4) Various articles on the subject of utilizing oil shale ash for calcium carbonate production and carbon dioxide capture have been previously published by Tallinn University of Technology. A 2011 paper, on the subject, presented a mathematical model for estimating the calcium carbonate precipitation process under various conditions. In this case, the model predicts the mass transfer during precipitation induced by carbon dioxide bubbling into a pure calcium hydroxide suspensions. Another paper by the same team, describes a method for producing precipitated calcium carbonate from oil shale ash and carbon dioxide. In the described method, water is used as the calcium extraction solvent and claims to produce approximately 96% pure calcium carbonate with a particle size in the range of 4-10 μm[9]. A later study by the researchers, described a process for producing precipitated calcium carbonate, via indirect aqueous carbonation, from oil shale ash. The main steps in the presented method are; i) calcium ion leaching from ash using water and ii) carbonation of the leachate in a continuous flow disintegrator-reactor accompanied by the crystallization of calcium carbonate. In the series of tests conducted, the researchers have claimed to have successfully produced, calcite crystals that has 92-99% calcium carbonate and a mean particle diameter in the range of 3.7-7.5 μm. Even though, the preceding tests were successful, in producing high grade calcium carbonate crystals, the tested processes will probably not be commercially viable. Methods that employ water as the calcium extracting agent will require large quantities of water and therefore also an increased amount of energy for pumping and heating. This disadvantage is attributed to the low solubility exhibited by calcium compounds in water.

5) Patent EE05446 (2011) outlines a method for eliminating carbon dioxide from flue gases by calcium compounds containing industrial wastes. The method proposes using oil shale ash, to produce a calcium rich solution, that ultimately acts as the carbon dioxide capturing medium. The main objective of the process is to capture carbon dioxide, from industrial flue gases, and the calcium carbonate precipitate appears to be a by-product from the process. To this effect, in the initial carbon dioxide capturing steps; the dissolution of calcium from ash, carbonation and calcium carbonate precipitation take place within the same reactor. Hence, most of the free calcium that can potentially be utilized to produce precipitated calcium carbonate is mixed with the ash and lost; making the method inefficient for precipitated calcium carbonate production.

6) Patent EE05349B1 (2010) presents a method for neutralization of alkaline wastewater with carbon dioxide in flue gases. The proposal's main objective is to neutralize wastewater with high alkalinity, i.e. specifically water that has been in contact with oil shale ash. The process does not control the calcium carbonate precipitation reaction rate that can affect the physical and chemical properties of the final product. Similar to the earlier described patent, this invention also utilises water as the solvent for dissolution of calcium ions.

7) A 2012 article by Eloneva, Said, Fogelholm, & Zevenhoven (2012) describes a method for producing precipitated calcium carbonate from steelmaking slag using ammonium salt (e.g. ammonium acetate, ammonium nitrate and ammonium chloride) as the calcium extraction agent. In the paper, the extracted calcium solution is bubbled with carbon dioxide to produce the calcium carbonate precipitate. Here, the ammonium salt is recovered and reused in the calcium extraction stage. Despite the similarities to the present art, due to the nature of the principal input material i.e. steelmaking slag, the method produces a hazardous residual slag (high in toxic trace metals such as vanadium[12,13]) that requires expensive handling and treatment.

8) Patent EP 2294233B1 (2017) describes an extended setup for the above process and proposes a method to recover vanadium from the residual slag. In this invention, the extraction of calcium is carried out using ammonium acetate solution. The residual material is subjected to further treatment, using a solution of ammonium dihydrogen phosphate ($(NH_4)H_2PO_4$), to subsequently produce a vanadium rich solution and a vanadium lean solid residue. The patent claims that the vanadium-enriched filtrate can be subjected to electrolysis, to produce metallic vanadium. Use of ammonium based salts, for selective calcium extraction, was first proposed by Yogo et al (2005) and since then the advantages of using them is well documented in a number of published research. Hence, the main inventive step, in this patent, appears to be the method proposed for enriching vanadium from the calcium depleted residual material. Slags originating from steel industry contain vanadium in high concentrations (2-3% in basic oxygen furnace slag[13]), and as claimed in the patent, this invention is intended specifically for extraction of resources from iron- and steelmaking slag.

9) Patent CA2814435C (2017) describes a method for production of high purity precipitated calcium carbonate using burnt lime (originating from mined calcium carbonate minerals such as marble, limestone and chalk) and ammonium chloride solution. In contrast to present invention, this method utilizes well known virgin calcium carbonate sources (such as marble, limestone and chalk) as the input raw material. The proposed materials are likely to produce a quality product, with low degree of process controls but is detrimental to the environment due to the use of virgin material. Environmental consequences of using virgin material, to produce precipitated calcium carbonate, is further highlighted in the following section.

OVERVIEW OF THE INVENTION

The disclosed invention aims to address some of the issues present in industries, that produce calcium rich waste and by-products. By adopting the disclosed invention, extraction of finite material resources is reduced, achieving a degree of circularity in industries that produce and utilize precipitated calcium carbonate and silicate minerals. Methods and processes employed in present invention have the dual advantage of valorizing the utilized waste streams, while simultaneously, capturing and reducing the carbon dioxide emission. For this reason, the methods presented here can be categorized as a carbon capture and utilization (CCU) technology.

The disclosed invention aims to provide a method for synthesizing high purity calcium carbonate precipitate, by utilizing calcium and silica bearing wastes and by-products, originating from industries, as the principal raw material; thereby reducing the extraction of virgin material for the purpose.

Simultaneously, the method aims to capture and utilize carbon dioxide, from industrial waste gases or otherwise. Also, the method aims to produce a silica rich residual material low in salts and contaminants, such as iron and manganese, so that the said material can be utilized in industries, as a silica source with no or few pre-treatments.

Furthermore, the present invention aims to decrease the hazardous nature of the silica rich residual material, from the process; so that the said material can be directly landfilled or backfilled as inert material with no or very little pre-treatment. Alternatively, the material can be utilized in cement and/or concrete production.

As evident from the descriptions of prior art, there exists number of methods and processes that are intended to produce high purity calcium carbonate precipitate. The majority of existing methods for producing precipitated calcium carbonate utilizes virgin material, as the calcium source, subsequently avoiding the complexities that comes with using highly heterogeneous industrial by-products. While using traditional materials and methods have advantages, notably the high-quality product it can produce with low degree of process controls; the production of burnt lime, the main raw material used for production, is a very energy intensive process[16]. Also, the material used for burnt lime production are calcium carbonate minerals such as marble, limestone and chalk; even though these are abundant minerals, the required grade for a high quality precipitated calcium carbonate product is found in limited sites. The present invention addresses these issues and proposes the use of secondary raw materials from industries as a substitute for mined calcium carbonate minerals to produce high-grade calcium carbonate precipitate.

Also, the proposal includes, production of a silica powder product that can be utilized in industries such as ceramic manufacturing and glass making.

Unlike known prior art, that describes single stage calcium extraction, in the principal embodiment of the disclosed invention, the input (calcium rich) material is subjected to multi-stage calcium extraction steps. This arrangement has the advantage of, i. reducing the mass of output residual material.

ii. reducing energy consumption per unit mass of calcium carbonate product produced.

iii. maximizing the carbon dioxide captured and utilized per unit mass of input material.

iv. reducing the chemical consumption per unit mass of calcium carbonate precipitate produced.

v. reducing the alkalinity of the residual material, consequently lowering the ecotoxicity of the material.

vi. concentrating the silica and magnesium in the residual material for later extraction or use.

There also exist inventions that utilize industrial by-products, for instance steelmaking slag, to produce high purity calcium carbonate precipitate. Generally, recycling and reuse of steelmaking slag is limited by the enriched toxic trace metals, in particular vanadium, and the phosphorous load in the material[12,13]. Due to this, the subsequent waste streams, from processes that use steelmaking slag, require expensive post-treatment[14]. In the present invention, these issues are addressed by proposing to use relatively "cleaner" secondary resources.

The beneficial effects of the invention are summarized below, i. produce a commercially viable product, i.e. high purity precipitated calcium carbonate, from industrial waste or by-products, thereby reducing virgin material mining, extraction and use.

ii. carbon dioxide originating from industries can be captured and utilized (CCU).

iii. reduced alkalinity, heavy metal and salt concentrations in the solid residual material left from the process.

iv. produce a material that can be utilized, as a silica source, in industries that use silicate minerals as a raw material.

v. produce a material that can be utilized in cement and/or concrete production, further reducing the carbon dioxide emission from industries.

DETAILED DESCRIPTION OF THE INVENTION

In order to achieve the aims, the present invention provides the following technical process: a multistage method for producing precipitated calcium carbonate and silica concentrate, from calcium and silica containing waste and by-products, using ammonium based aqueous solution as the calcium extracting agent.

Figure 1:
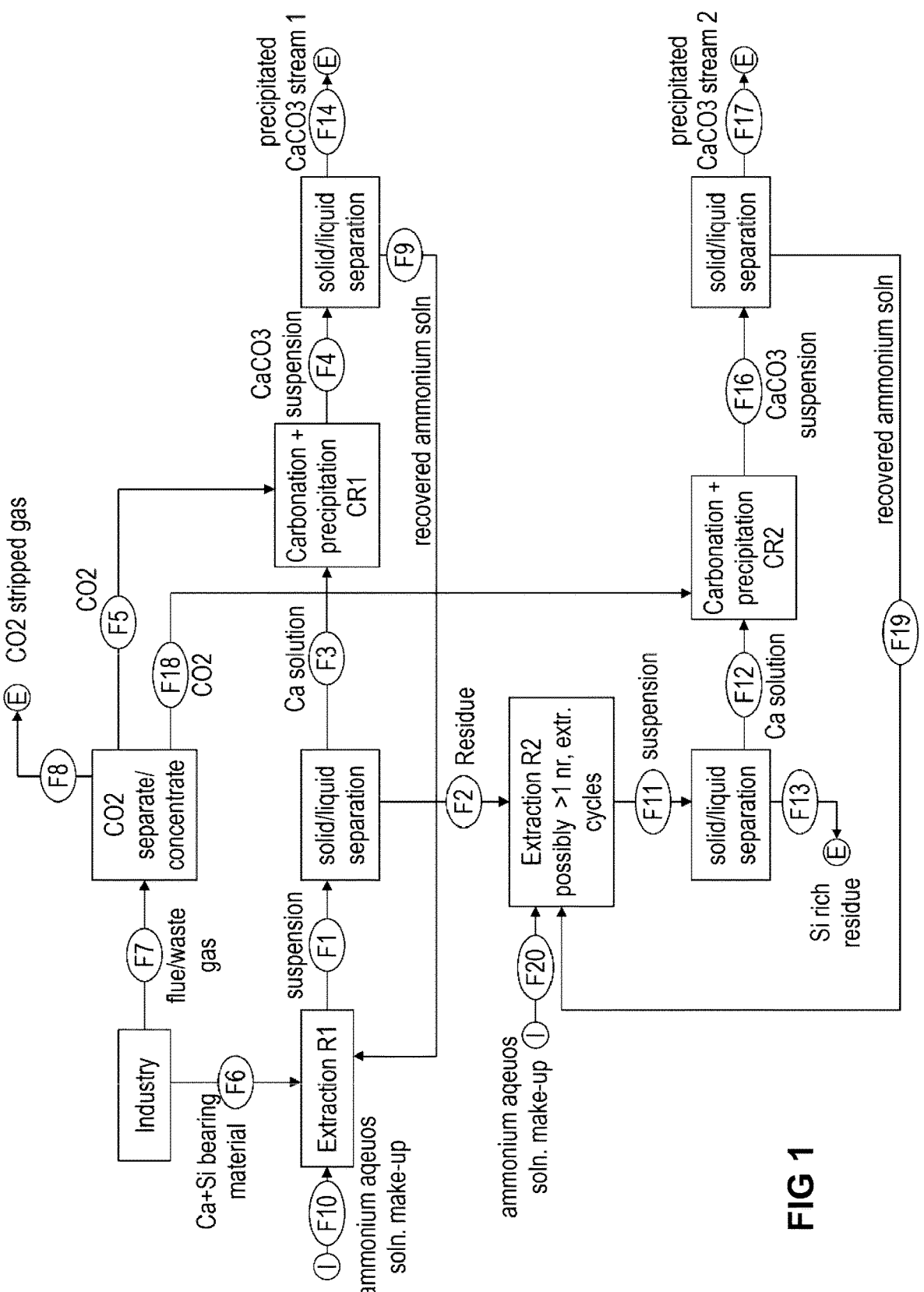
FIG. 1 depicts the first or principal embodiment of the present invention.

The principal embodiment of the invention comprises the following steps (ref FIG. 1).

Step 1. Add solid calcium and silica bearing material into the extraction solution (in reactor—R1).

For the first calcium dissolution step; the preferred operational parameters are influenced by several factors. Under optimum operational conditions, maximum amount of calcium ions will leach out, from the calcium bearing material, by using minimum energy and least amount of extraction chemical. The conditions shall also, discourage leaching of elements, such as iron or manganese, which are known to have a detrimental effect on the end product quality. Furthermore, the selected conditions shall avoid jelling of silicates, which can complicate the operation.

The extraction process is carried out using an ammonium-based aqueous solution. The chosen solutions can selectively extract calcium ions, from silicate minerals containing calcium, without dissolving contaminants (such as salts, iron and manganese), which may co-precipitate with the calcium carbonate in the subsequent precipitation stage. The said solution is either ammonium acetate ($CH_3COONH_4$), ammonium chloride ($NH_4Cl$) or any other ammonium-based aqueous solution, but preferably ammonium chloride ($NH_4Cl$) or most preferably ammonium acetate ($CH_3COONH_4$).

The material, from which calcium is extracted, can be any alkaline, calcium bearing compound but preferably is a material deemed to be an industrial waste or by-product; and can be sourced either directly or indirectly from production, landfills, deposits and/or stockpiles. Examples of such materials are oil shale ash from energy or oil and gas generation, coal ash and waste cement. The most preferable material, from these examples, for the disclosed invention is oil shale ash from energy generation. The material shall be fine grained with a nominal grain size of; preferably <1000 μm, more preferably <500 μm and most preferably <200 μm. Materials with larger sized particles are preferably mechanically sieved or more preferably mechanically comminuted in a dry environment.

Lower temperatures will improve the ultimate amount of calcium ions that are extracted from the material but will also, inevitably lower the dissolution rate. The temperature in the extraction reactor shall be within the range 3° C.-100° C. but preferably within the range 15° C.-80° C. The most preferable temperature range for dissolution is 25° C.-70° C.

The solid to liquid ratio in the dissolution reactor is between the range 1:1-1:20, preferably between 1:1-1:10 but most preferably between 1:1-1:5.

The molarity in the dissolution reactor is preferably between the range 0.1-3M but most preferably within the range 1.5-2M.

At the end of the dissolution stage, the resulting mixture has a pH range between 8-13.

The reactor used in this stage is a continuously stirred reactor.

Step 2. Separate the solid residual material from the calcium rich solution. The selected separation method will depend on grain size, grain distribution and the density of residual material. The separation technique may involve one of, or a combination of some or all the methods: sedimentation, centrifugation, decanting, filtration, reverse osmosis.

Residual material from this step is directed to a separate reactor (R2) for a second calcium extraction stage. The calcium rich solution is subjected to carbonation to precipitate high purity calcium carbonate (in reactor CR1).

Step 3. The carbonation is induced by introducing carbon dioxide gas directly into the calcium containing aqueous solution in a closed reactor. The carbon dioxide will hydrolyze to form bi-carbonates that will dissociate to a carbonate and hydrogen ion. The carbonate ion will readily react with the calcium ions in solution to form calcium carbonate precipitate.

Carbon dioxide gas hydration reaction $$CO_2(l) + H_2O \leftrightarrow HCO_3^- + H^+$$

Calcium carbonate crystal formation:

$$Ca^{2+} + CO_3^{2-} \leftrightarrow CaCO_3\downarrow$$

Calcium carbonate re-dissolution:

$$CaCO_3 + H^+ \leftrightarrow Ca^{2+} + HCO_3^-$$

It is noted that, carbon dioxide dissolution in water is influenced by pH. Carbon dioxide dissolving in water will mainly form $CO_3^{2-}$ at pH>9 and $HCO_3^-$ at pH<9. Therefore, in theory, the maximum amount of calcium carbonate crystals will form around pH $9^9$. In the present invention, the solution into which carbon dioxide is introduced, is not water, hence the optimal pH level for maximum crystal formation is different. To avoid back dissolution of calcium carbonate crystals, the pH of the solution is preferably >7.5 but most preferably >8.

The carbon dioxide is introduced into the calcium containing solution either by bubbling or spraying. The temperature during carbonation is kept between 3° C.-80° C. but preferably between 15° C.-60° C.; and most preferably within the range 25° C.-45° C. Carbon dioxide utilized for carbonation can be either carbon dioxide or preferably carbon dioxide containing waste gases (carbon dioxide>5 vol %). More preferably the carbon dioxide gas originates from industries such as oil shale thermal plants but most preferably this gas is also separated, purified and concentrated before use.

Step 4. Separate the calcium carbonate precipitate from solution. Selected separation method will depend on grain size, grain distribution and the density of precipitate. The separation technique may involve one of, or a combination of some or all the methods: sedimentation, centrifugation, decanting, filtration, reverse osmosis.

The ammonium based aqueous solution is recovered and directed back to extraction reactor R1, for use in the first calcium extraction stage.

Step 5. Residual material from step 2 is directed to the extraction reactor R2 where a second calcium extraction step takes place. The conditions (temperature, solution molarity, solid to liquid ratio etc.) in reactor R2 is kept within the same ranges as in R1.

In reactor R2, the residual material may be subjected to >1 number extraction cycles. This is determined based on the concentration of calcium ions leaching from a specific extraction cycle, relative to the magnitude of aqueous solution make-up and total energy consumed.

$$\frac{[Ca^{+2}]}{Energy\ spent \times Extraction\ solution\ makeup}$$

If the calcium ion concentration is deemed low, relative to the resources utilized, then the residue batch is directed to the solid-liquid separation step, together with solution.

Step 6. Separate the solid residual material from calcium rich solution. The separation technique may involve one of, or a combination of some or all the methods: sedimentation, centrifugation, decanting, filtration, reverse osmosis.

Step 7. The calcium rich solution is subjected to carbonation in carbonation reactor-CR2 to precipitate calcium carbonate. The carbonation is induced by introducing carbon dioxide gas directly into the calcium containing aqueous solution in a closed reactor. The carbon dioxide is introduced into the calcium containing solution either by bubbling or spraying. The physical parameters, such as temperature, in reactor CR2 is kept within the same ranges as in CR1 (presented in Step 3).

The carbon dioxide utilized for carbonation can be either carbon dioxide or preferably carbon dioxide containing waste gases (carbon dioxide >5 vol %). More preferably the waste gas originates from industries such as oil shale thermal plants but most preferably this gas is also separated, purified and concentrated before use.

Step 8. Separate the calcium carbonate precipitate from solution. The separation technique may involve one of, or a combination of some or all the methods: sedimentation, centrifugation, decanting, filtration, reverse osmosis. The ammonium based aqueous solution is recovered and directed, to extraction reactor R2, for use in the calcium extraction.

If desired, the calcium carbonate precipitate produced from the second carbonation stage can have different physical properties, in comparison to the precipitate from the first carbonation stage. This can be achieved by varying the operational parameters (temperature, carbonation duration, rate of carbonation, carbon dioxide bubble size etc.) in the carbonation reactor. This would indicate that the described technology can produce, precipitated calcium carbonate exhibiting different physical properties simultaneously.

The precipitated calcium carbonate produced from both streams are characterized by; a fine-grained, white colored powder with a calcium carbonate content >95 w/w % and an average particle diameter 0.05-10 μm. The iron-III-oxide ($Fe_2O_3$) concentration is <0.2 w/w % and the Hunter Whiteness Index is >85%.

The residual material from first (Step 2) and second (Step 6) stream are characterized by; a fine-grained, light grey colored powder. The silica oxide and magnesium oxide concentration from first stream is >40 w/w % and >10 w/w % respectively. In the second stream the silica oxide and magnesium oxide concentrations are >45 w/w % and >15 w/w % respectively.

As further improvement, to the present invention, the precipitate of calcium carbonate is washed with water and de-watered to obtain a dry precipitated calcium carbonate product. Similarly, the residual output material is washed with water and de-watered. The ammonium salts, in the washed solutions, are concentrated by distillation or more preferably by membrane separation; and re-used in the calcium extraction process. This will reduce the loss of ammonium solvents from the system.

As further improvement, to the present invention, the ferromagnetic material in residual output material (from Step 6) will be isolated using magnetic and/or chemical extraction methods and processed.

As further improvement, of the present invention, the residual material (from Step 6) can be utilized in cement and/or concrete production with no or minimal pre-treatment.

As further improvement, of the present invention, the residual output material (from Step 6) can be further processed, to utilize as a substitute for silica minerals in industry.

As further improvement, of the present invention, the residual output material (from Step 6) can be directly landfilled or backfilled as inert material.

Figure 2:
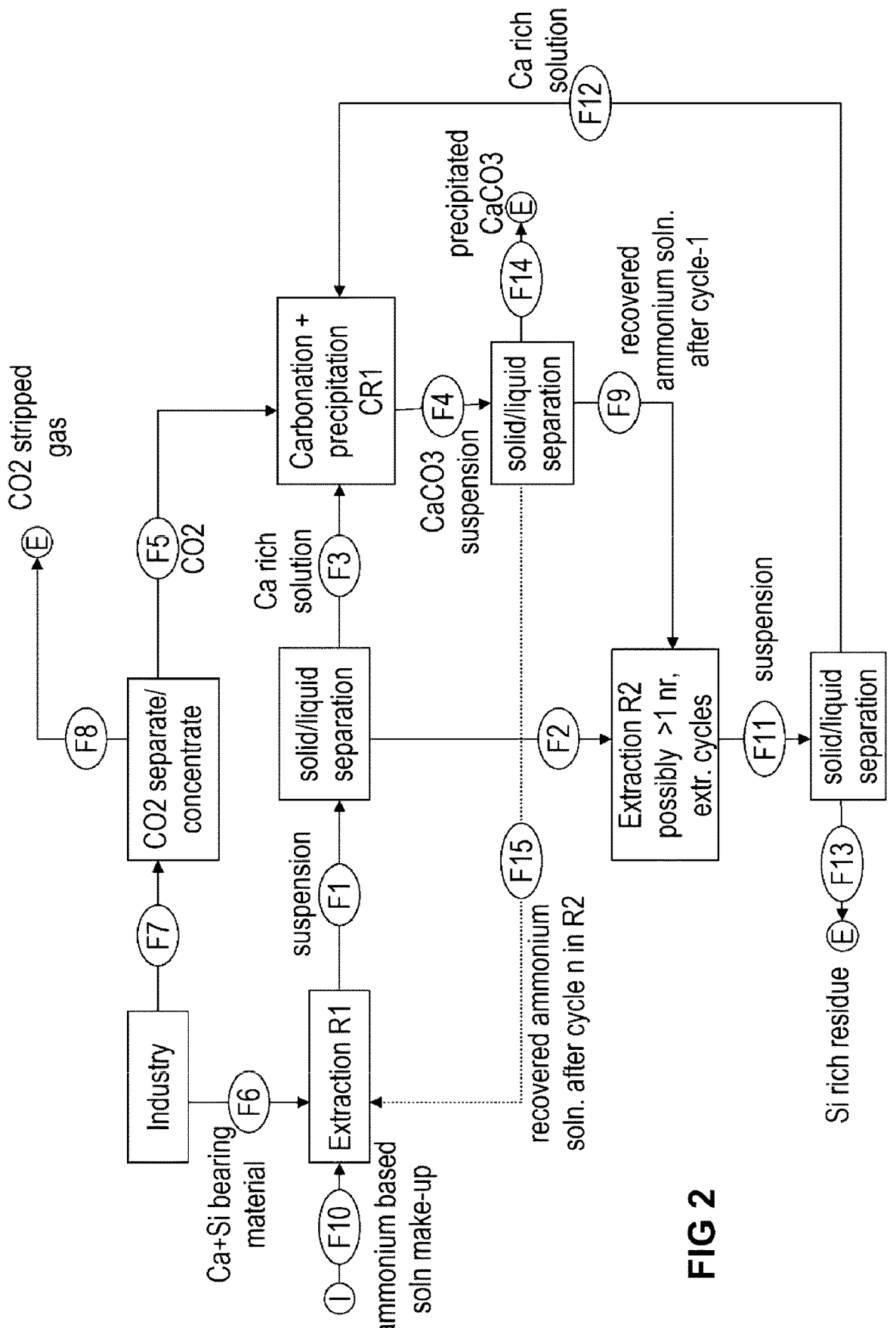
FIG. 2 depicts the second embodiment of the present invention, whereby a single carbonation reactor is present, in comparison, the principal embodiment has two carbonation reactors.

In another embodiment of the present invention (second embodiment, FIG. 2); the setup has a single carbonation reactor in comparison to the principal embodiment that has two carbonation reactors. In this arrangement, the calcium rich solution from Step 6, is re-circulated back to the carbonation reactor CR1.

In this set-up a single output stream of calcium carbonate precipitate is present. Relative to the principal embodiment, this arrangement has a; lower operational cost (due to lower chemical and energy consumption) and lower capital cost (due to lesser piping and reactor numbers).

Figure 3:
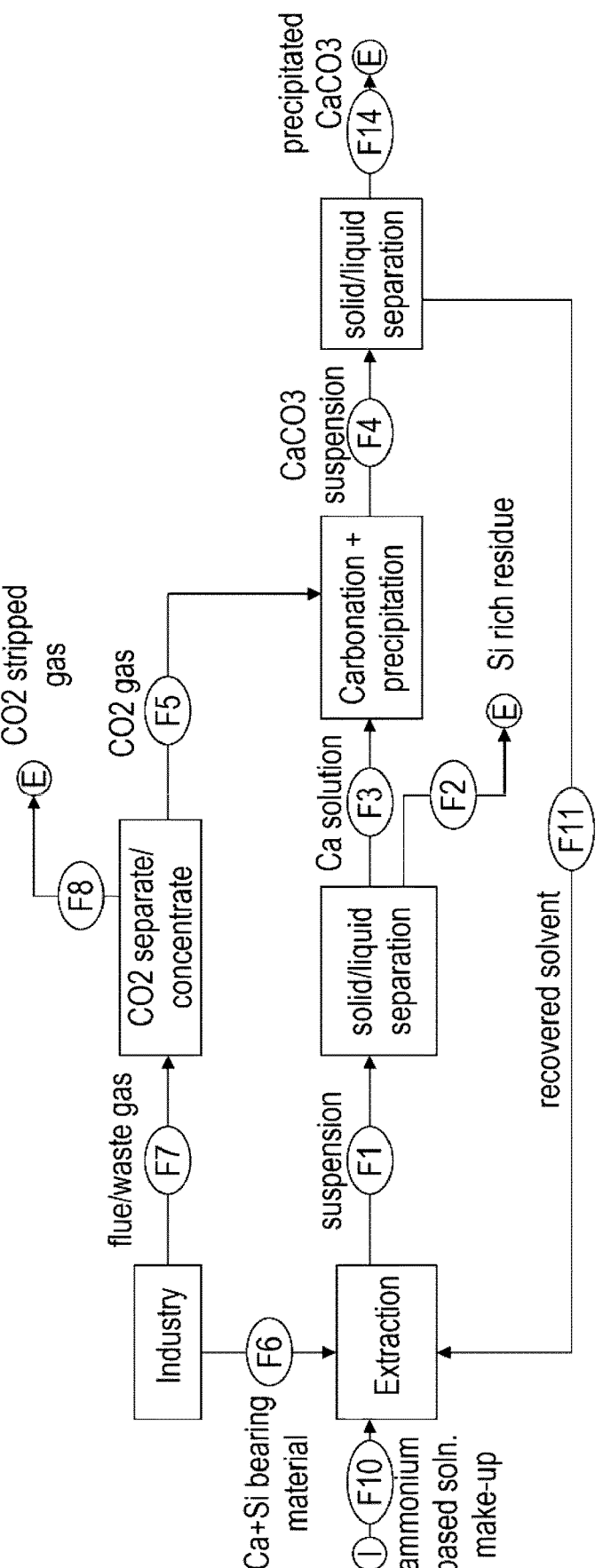
FIG. 3 depicts the third embodiment of the present invention, whereby a single extraction and a single carbonation reactor is present, in comparison, previous embodiments have two extraction reactors and one or two number carbonation reactors.

In another embodiment of the disclosed method (third embodiment, FIG. 3); a single calcium extraction stage is present. While this approach has some advantages, in comparison to other embodiments; such as lower energy usage, lower chemical loss and a leaner process; the setup will produce a lower grade silica stream (high calcium concentration) compared to a multi-stage extraction. The calcium carbonate yield per unit mass of input solid material, will also be lower. The advantages of the principal embodiment were previously listed in section: overview of the invention.

Figure 4:
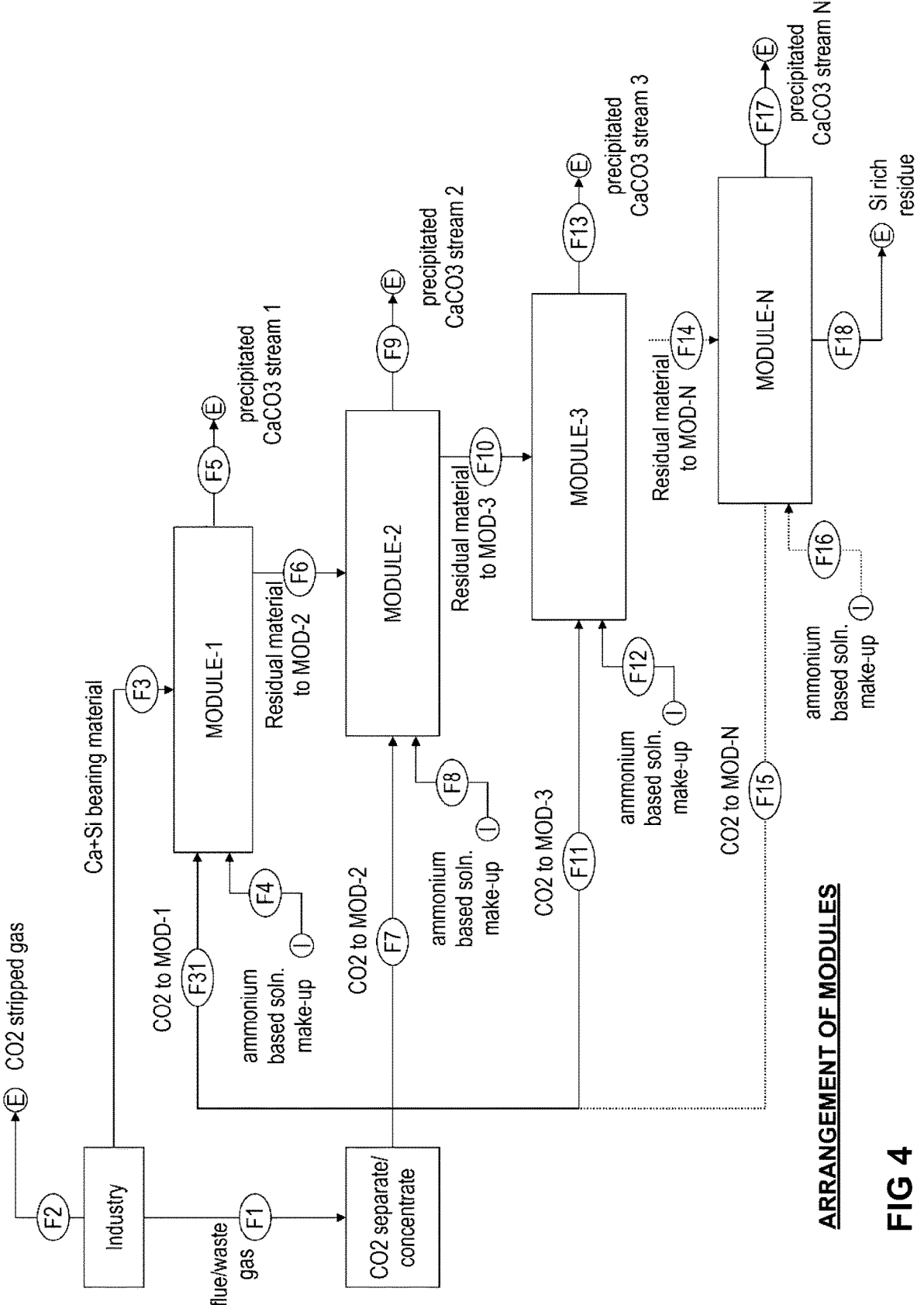
FIG. 4 depicts the fourth embodiment of the present invention, whereby several modules are set-up in a serial arrangement. Each module consists of the steps; i) extraction of calcium, ii) solid/liquid separation, iii) carbonation and precipitation, iv) solid/liquid separation to receive calcium carbonate precipitate.
Figure 4:
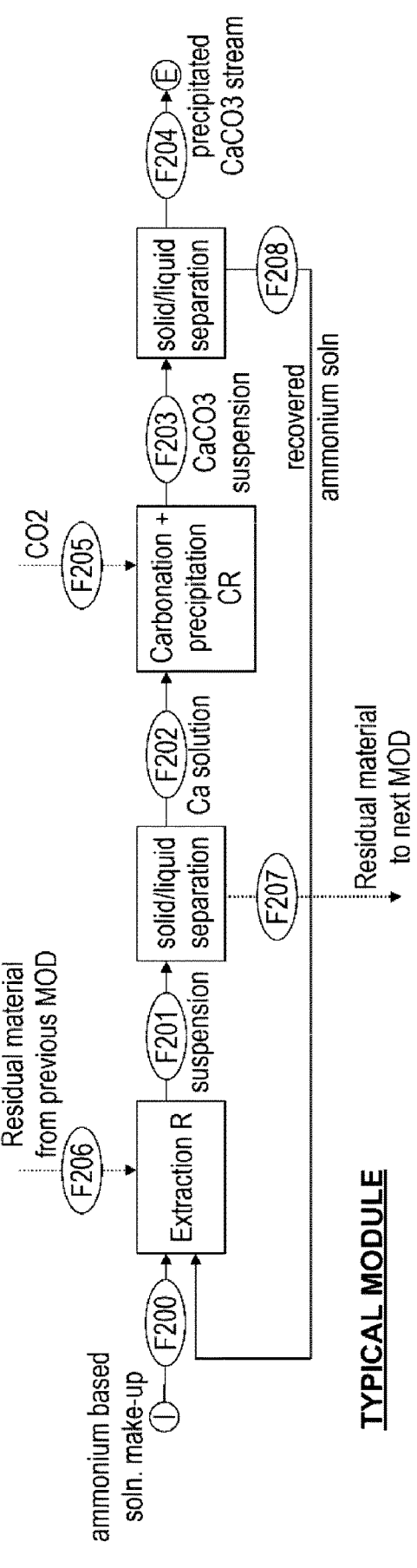

In another embodiment of the disclosed method (fourth embodiment, FIG. 4); several modules are set-up in a serial arrangement. Each module consists of the steps; i) extraction of calcium, ii) solid/liquid separation, iii) carbonation and precipitation, iv) solid/liquid separation to receive the calcium carbonate precipitate. In this arrangement, the initial input material for each module is the solid residue from the solid/liquid separation step (after calcium extraction) of previous module. This arrangement gives a high degree of control during the extraction and precipitation stage, if desired, to synthesize physically different or similar calcium carbonate crystals from each stream. If the operational parameters are same in all the calcium extraction steps, the calcium ions leaching during each extraction stage will be lower, relative to the previous stage. This variation in calcium concentration can influence the physical characteristics of calcium carbonate crystals formed during carbonation. By adopting, this embodiment, it is possible to adjust the operational parameters, to cater for the reducing calcium concentration in each subsequent leachate solution. The number of modules in the series will be determined based on a cost/benefit analysis. This is directly related to the amount of leachable calcium present, in the calcium bearing material, in relation to the operational conditions employed.

REFERENCES

1. Keams J, Tuohy E, Tuohy E. Trends in Estonian oil shale utilization. 2015; (October):22. http://www.digar.ee/id/nlib-digar.268094.
2. OECD. Environmental performance reviews: Estonia Highlights 2014. *Environ Perform Rev.* 2014. https://issuu.com/oecd.publishing/docs/oecd_epr_estonia_highlights.
3. Estonian Environment Agency. Estonian Environmental Review 2013. 2014. https://www.keskkonnaagentuur.ee/en/estonian-environmental-review-2013-1.

4. Blinova I, Bityukova L, Kasemets K, et al. Environmental hazard of oil shale combustion fly ash. *J Hazard Mater.* 2012; 229-230192-200. doi:10.1016/jjhaz-mat.2012.05.095
5. Wimala M, Parahyangan U K. Environmental Impact of Waste Concrete Treatment in Precast Concrete Production. 2017; (July 2011).
6. Bemal S A, Rodrfguez E D, Kirchheim A P, Provis J L Management and valorisation of wastes through use in producing alkali-activated cement materials. *J Chem Technol Biotechnol.* 2016; 91(9):2365-2388. doi:10.1002/jctb.4927
7. Stratton P. An Overview of the North American Calcium Carbonate Market. https://roskill.com/wp/wp-content/uploads/2014/11/download-roskills-paper-on-the-north-american-calcium-carbonate-market.attachmentl.pdf. Published 2012. Accessed Jan. 20, 2020.
8. Velts O, Uibu M, Kallas J, Kuusik R. CO2 mineral trapping: Modeling of calcium carbonate precipitation in a semi-batch reactor. *Energy Procedia.* 2011; 4:771-778. doi:10.1016/j.egypro.2011.01.118
9. Velts O, Uibu M, Kallas J, Kuusik R. CO2 Mineralisation: Concept for Co-utilization of Oil Shale Energetics Waste Streams in CaCO3 Production. *Energy Procedia.* 2013; 37 (January 2016):5921-5928. doi:10.1016/j.egypro.2013.06.518
10. Kuusik R, Uibu M, Uus M, Velts O, Trikkel A, Veinjarv R. Method for elimination of CO2 from flue gases using calcium containing compounds from industrial waste. 2011.
11. Eloneva S, Said A, Fogelholm C J, Zevenhoven R. Preliminary assessment of a method utilizing carbon dioxide and steelmaking slags to produce precipitated calcium carbonate. *Appl Energy.* 2012; 90(1):329-334. doi:10.1016/j.apenergy.2011.05.045
12. Hobson A J, Stewart D I, Mortimer R J G, Mayes W M, Rogerson M, Burke IT. Leaching behaviour of co-disposed steel making wastes: Effects of aeration on leachate chemistry and vanadium mobilisation. *Waste Manag.* 2018; 81:1-10. doi:10.1016/j.wasman.2018.09.046
13. Ye G, Kärsrud K, Lindvall M. Overview of the VILD-project, Vanadium Recovery from BOF-slag, a Long Term Slag Project for the Swedish Steel Industry. *Fray Int Symp.* 2011; (May):1-11.
14. Teir S, Eloneva S, Revitzer H, Zevenhoven R. Salminen J, Fogelholm C-J. Method of Producing Calcium Carbonate From Waste and Byproducts. 2017:1-14.
15. Yogo K, Teng Y, Yashima T, Yamada K. Development of a new CO2 fixation/utilization process (1): Recovery of calcium from steelmaking slag and chemical fixation of carbon dioxide by carbonation reaction. *J Chem Inf Model.* 2005:2427. doi:10.1017/CB09781107415324.004
16. Sagastume Gutiérrez A, Cogollos Martinez J B, Vandecasteele C. Energy and exergy assessments of a lime shaft kiln. *Appl Therm Eng.* 2013; 51(1-2):273-280. doi:10.1016/j.applthermaleng.2012.07.013

The invention claimed is:

1. A method comprising producing precipitated calcium carbonate from a starting waste material comprising calcium and silica, wherein the starting waste material is selected from the group consisting of oil shale ash, coal ash and waste cement, the method comprising continuously performing the following steps:

(a) a first calcium extraction step for extracting the starting waste material with a first ammonium-based aqueous solution to yield a first suspension comprising a first calcium rich eluate and a first residual waste material, and separately recovering the first calcium rich eluate and the first residual waste material from the first suspension;

(b) a first carbonating step for carbonating the first calcium rich eluate recovered in the first calcium extraction step to yield a second suspension comprising a first calcium carbonate precipitate and a first regenerated ammonium-based aqueous solution, and separately recovering the first calcium carbon precipitate and the first regenerated ammonium-based aqueous solution from the second suspension;

(c) a second calcium extraction step for extracting the first residual waste material recovered from the first calcium extraction step with the first regenerated ammonium-based aqueous solution to yield a third suspension comprising a second calcium rich eluate and a second residual waste material, and separately recovering the second calcium rich eluate and the second residual waste material from the third suspension;

(d) a second carbonating step for carbonating the second calcium rich eluate from the second calcium extraction step to yield a fourth suspension comprising a second calcium carbonate precipitate and a second regenerated ammonium-based aqueous solution, and separately recovering the second calcium carbon precipitate and the second regenerated ammonium-based aqueous solution from the fourth suspension; and (e) a recycling step for recycling each of the first and second regenerated ammonium-based aqueous solutions recovered after the respective first and second carbonating steps for use in the first and second calcium extraction steps;

wherein steps (a)-(e) are performed under conditions such that each of the first and second calcium carbonate precipitates recovered after the respective first and second carbonating steps has a calcium carbonate concentration of greater than 95 w/w % and the second residual waste material recovered after the second calcium extraction step has a higher concentration of silica than the starting waste material.

2. The method according to claim 1, wherein each of the first and second ammonium-based aqueous solutions comprises ammonium chloride ($NH_4Cl$) or ammonium acetate ($CH_3COONH_4$).

3. The method according to claim 1, comprising prior to step (a) a step of mechanically comminution of the waste material so that it has a nominal grain size of less than 1000 µm.

4. The method according to claim 1, wherein in the first calcium extraction step the starting waste material is extracted with the first ammonium-based aqueous solution in a first extraction reactor at a temperature within the range of 15° C.-80° C.; wherein a solid to liquid ratio in the first extraction reactor is in a range of 1:1-1:10; wherein a molarity in the first extraction reactor is in a range 1.0-3M;

and wherein at an end of the first calcium extraction step, the first suspension has a pH in a range between 8-13.

5. The method according to claim 4, wherein, in the first and second carbonating steps, each of the respective second and fourth suspensions has a pH that is greater than 8.

6. The method according to claim 5, wherein each of the first and second carbonating steps comprises introducing carbon dioxide into the first and second calcium rich eluates respectively by bubbling or spraying at a temperature between 15° C.-60° C.

7. The method according to claim 6, wherein each of the first and second carbonating steps is performed in a separate reactor and, in each of the separate reactors, the carbon dioxide is present in an amount >5 vol % of gas.

8. The method according to claim 1, wherein for each of the first, second, third and fourth suspensions solids are separated from liquids by a separation method selected from the group consisting of sedimentation, centrifugation, decanting, filtration, reverse osmosis and a combination thereof.

9. The method according to claim 1, wherein each of the first and second calcium carbonate precipitates recovered after the respective first and second carbonating steps has an average particle diameter between 0.05-10 µm; an iron-III-oxide ($Fe_2O_3$) concentration of <0.2 w/w %, and a Hunter Whiteness Index of >85%.

10. The method according to claim 9, further comprising the step of washing the first and second calcium carbonate precipitates and the second residual waste material with a wash solution comprising water.

11. The method according to claim 10, wherein the first ammonium-based aqueous solution comprises ammonium salts from the wash solution that are concentrated by distillation or membrane separation.

12. The method according to claim 1, comprising isolating ferromagnetic material from the second residual waste material by a magnetic and/or chemical extraction.

13. The method according to claim 1, wherein each of the first calcium extraction step, the first carbonating step, the second calcium extraction step, the second calcium extraction step and the second carbonating step is performed in a different reactor.

14. The method according to claim 1, wherein the first and second carbonating steps are performed in the same reactor.

15. The method according to claim 1, wherein the method is carried out in an apparatus comprising separate modules for each of the steps (a)-(e).

16. The method according to claim 1, wherein the second residual waste material has a concentration of silica oxide that is greater than 40 w/w %.

17. The method according to claim 16, wherein the second residual waste material has a magnesium oxide concentration of greater than 15 w/w %.

*     *     *     *     *